Feb. 24, 1931.    G. C. THOMAS, JR    1,793,881
CABLE CONNECTER
Filed July 26, 1926
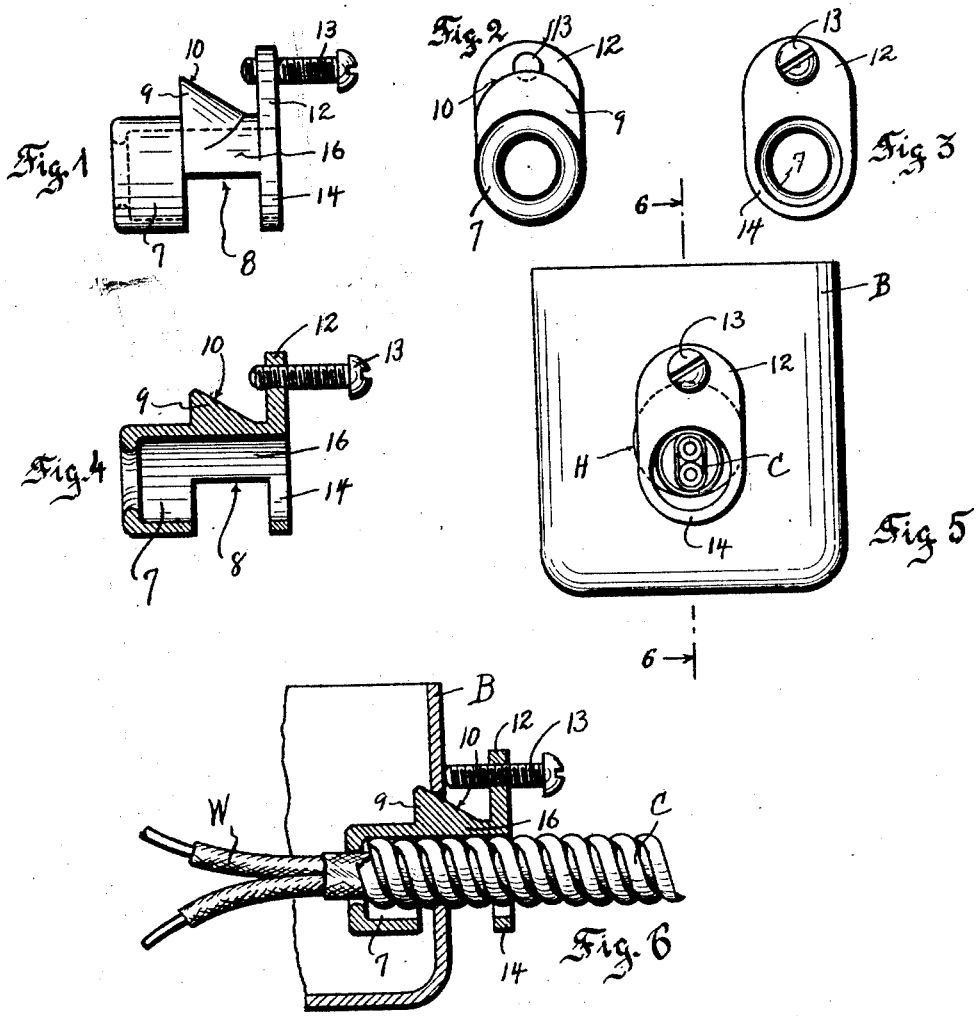
INVENTOR
George C. Thomas, Jr.
BY
Bohleber & Ledbetter
ATTORNEYS Patented Feb. 24, 1931

1,793,881

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed July 26, 1926. Serial No. 124,822.

This invention relates to cable and box connecting means, and more particularly to improvements in connecters for anchoring cable to electric fixture boxes and the like.

Among other things, it is an object of the invention to produce a cable connecter which embodies a single operating means, such as a screw, adapted to bear against and react from a box wall to impart motion to a connecter relatively in the box hole to anchor the connecter and the cable to the exposed edge or circular rim of the box without passing the screw through the box wall or otherwise connecting it directly therewith.

An example of the invention is shown in the accompanying drawings, serving to illustrate the underlying principles of the invention and showing one embodiment thereof.

Figure 1 shows a side elevation of the connecter, Figure 2 shows an inner end elevation, and Figure 3 shows an outside end elevation.

Figure 4 shows a lingitudinal sectional view of the connecter.

Figure 5 illustrates an outside view of the connecter and cable anchored to a box.

Figure 6 shows a longitudinal sectional view developed along the line 6—6 of Figure 5.

Electric fixture boxes B are manufactured with knock-out holes H to receive the cable C and connecter to enable the wires W to be manipulated and connected to other wires received into the box B, and it is an object of my invention to produce an improved connecter for anchoring the cable to the box.

The connecter essentially comprises a wedging member made suitable in size to fit into the box hole alongside of the cable and to leave exposed a part of the box hole edge and to cover or conceal the other part thereof. The exposed part of said box hole edge sharply grips against the cable C to anchor it in position while the concealed part of the box hole edge bears against an incline plane wedging means or nose included on the connecter to force the connecter laterally with respect to the box hole axis by actuation of a single operating means, and one example of a connecter embodying the invention will now be described.

The connecter member may assume a sleeve 7 formation mutilated in respect to removing a portion of one end of the sleeve, or more appropriately by casting the sleeve with a large portion at one end omitted to form a gap or opening 8 directly underneath a box hole edge or box wall abutment means in the form of a nose 9 having an incline plane 10 forming the nose or wedging means which is adapted to nose against and forcibly slide in relation to the box hole edge to impart the necessary lateral motion to the connecter as will be described.

An ear 12 is spaced from the incline plane wedging means and carries a screw 13, the inner end of which is directed towards the incline plane 10. An end ring-like portion 14 may be made on the connecter underneath the ear 12 if desired and through which the cable C is introduced, although this part 14 is not always essential for it is the box hole edge itself which establishes anchorage with both the connecter and cable to secure all parts together.

The inclined wedging plane 10 is in reality carried on the connecter end 16 integrally formed as a projection at one end of the sleeve 7 so that the inclined portion 9 is spaced from the sleeve end. The screw and incline plane 10 are preferably made on the same side of the connecter in order to cooperate and impart motion to the connecter by which a double purpose is served, namely, that of gripping a cable against the exposed box hole edge, and that of seating the box hole edge between the end of the screw as one abutment and the inclined plane 10 as another abutment.

The connecter is mounted in the box hole with the screw run back away from the nose 9 so that the connecter end 16 is free to move laterally up and down in the box hole H to permit the cable C to be introduced into the connecter and into the box hole. The box hole edge H rests against the lower end of the nose 9 and the screw 13 is now run up against the box wall which produces a reaction through the screw and ear 12 thereby imparting lengthwise motion to the connecter in the box hole by reason of the screw, and resulting in lateral motion of the connecter with respect to the box hole axis by reason of movement of the nose 9 climbing under the box hole edge. Therefore the connecter 16 is gradually forced down against the cable C to grip it against the exposed box hole edge.

The screw 13 and wedge 9 form overlapping abutment means into and between which the box edge is received to anchor the connecter 7 against longitudinal movement after the screw is tightened up. The screw prevents lengthwise movement of the connecter in the box hole in one direction, while the wedge 9 prevents displacement in the other direction.

Thus I have produced an improved connecter which is moved longitudinally by actuation of an operating means, as the screw, which results in lateral motion with respect to the box hole axis to ultimately grip the cable C against the exposed box hole edge, and the cable itself may slip or slide slightly at the end of the tightening motion to establish a more positive hold on the box wall edge.

According to the principles of the invention, the screw 13 and wedging nose 9 may be placed on either side of the box wall B as desired, the result being the same as to whether the screw reacts from the inside of the box wall or from the outside thereof for it is the screw which draws or pulls the connecter through or along the box hole edge to impart the resultant lateral gripping motion to the connecter and this action seats, with increasingly applied force, the abutments 9 and 13 to either side of the box wall.

What I claim is:

1. A connecter comprising a sleeve to fit over a cable, a portion of said sleeve cut away to expose the box hole edge when the connecter is in position in the box hole, an inclined member upon the sleeve and opposite the cut away portion, means to cause axial movement of the sleeve with respect to the box hole whereby the inclined member engages the box hole edge to cause transverse movement of the sleeve to clamp a cable between the box hole edge and the sleeve, and an end portion projecting from the sleeve end.

2. A connecter comprising a sleeve to fit over a cable having a portion cut away intermediate the ends to expose the box hole edge when the connecter is in position in the box hole forming an end ring, an inclined member upon the sleeve and opposite the cut away portion, and means to cause axial movement of the sleeve with respect to the box hole whereby the inclined member engages the box hole edge to cause transverse movement of the sleeve to clamp a cable between the box hole edge and the sleeve.

In testimony whereof I affix my signature.

GEORGE C. THOMAS, Jr.